United States Patent [19]
Holdeman et al.

[11] 3,788,075
[45] Jan. 29, 1974

[54] VALVE MECHANISM

[75] Inventors: John W. Holdeman, Muncie, Ind.; Kenneth G. McMillen, deceased, late of New Castle, Ind.; Leanne S. McMillan, administratrix, Fort Wayne, Ind.

[73] Assignee: Borg-Warner Corporation, Chicago, Ill.

[22] Filed: July 13, 1972

[21] Appl. No.: 271,305

[52] U.S. Cl. .................... 60/424, 60/97 P, 60/484, 60/489
[51] Int. Cl. .......................................... F15b 11/16
[58] Field of Search ............ 60/424, 483, 484, 97 P

[56] References Cited
UNITED STATES PATENTS

| | | | |
|---|---|---|---|
| 2,541,292 | 2/1951 | Robinson | 60/424 X |
| 2,953,903 | 9/1960 | Skoog et al. | 60/97 P |
| 2,959,923 | 11/1960 | Shook | 60/97 P |
| 3,506,081 | 4/1970 | Rumsey | 60/424 X |

Primary Examiner—Edgar W. Geoghegan
Attorney, Agent, or Firm—Donald W. Banner et al.

[57] ABSTRACT

A pressure equalizer valve and reversible flow logic system are provided for reversible fluid motors that are connected in series. The pressure equalizer valve is effective to bypass a small quantity of fluid from the source of fluid pressure to the junction between the motors or from the junction between the motors to a low pressure conduit. This bypassing of fluid is effective to provide equal or proportional operating pressures across the fluid motors, to prevent cavitation of the downstream fluid motor, and to act as a fluid differential for the fluid motors when propelling a vehicle that is making a turn. The logic system provides reversible flow fluid communication between the fluid motors and the equalizer valve so that the equalizer valve functions properly when the fluid motors are reversed.

18 Claims, 3 Drawing Figures

VALVE MECHANISM

BACKGROUND OF THE INVENTION

Some of the problems involved in the operation of series connected motors for use in propelling vehicles have been recognized for quite some time. For instance, Robinson in U.S. Pat. No. 2,541,290 provided an equalizer valve for series connected motors which was effective to provide fluid from the source of fluid pressure to the downstream motor thereby preventing the downstream motor from operating at a lower pressure than the upstream motor. However, Robinson's equalizer valve was not able to prevent excessive pressures on the downstream motor because the check valves that were used to connect the equalizer valve to the fluid motors would not allow the piston in the equalizer valve to move in the direction that would have allowed the equalizer piston to bypass fluid from the junction between the motors to the sump.

The present invention provides a pressure equalizer valve and logic system that are adapted to provide fluid from the source of fluid pressure to the downstream motor as has been accomplished by prior inventions. This function is effective to provide fluid to make up for the leakage fluid of the upstream motor, which leakage fluid is returned to sump. It is also effective to provide additional fluid for operation of the downstream motor when this motor is driving a vehicle that is making a turn; and the downstream motor is on the outside of the turn thereby being required to turn faster and requiring more fluid.

SUMMARY OF THE INVENTION

The present invention is advantageous over prior art in that it is also adapted to bypass fluid from the junction between the motors to the sump. The need for this function will be shown in the following discussion.

When the fluid motors are propelling a vehicle with one motor driving a wheel on the left side thereof and the other driving a wheel on the right side thereof, unequal flows are required by the motors when the vehicle is making turns because of the unequal distances traveled by the wheels. When the downstream motor is driving the wheel on the inside of the turn, the upstream motor will supply an excessive flow to the downstream motor; and the result will be that the downstream motor will attempt to propel the vehicle without the assistance of the upstream motor. This condition results in unequal division of the fluid pressures with excessive wear of the downstream motor. It also results in a vehicle that speeds up during cornering operations because the vehicle speed becomes a function of the distance that the inside wheel travels. In addition, the operating pressure of the system is raised because of the mechanical disadvantage of the inside wheel trying to propel the vehicle at a faster speed than it is going. This limits the ability of the fluid motors to propel the machine, and, in vehicles requiring a tight turning radius, the system will be severely limited in torque capacity in these turns.

The present invention is effective to equalize the fluid pressures across the upstream and downstream motors; and so it is also effective to prevent the motor on the inside of the turn from trying to propel the vehicle at faster speeds during turns.

Equalization of the fluid pressures during turns is also effective to equally distribute driving torque to the ground; thereby minimizing wheel slip and minimizing the danger of the vehicle becoming mired down in muddy terrain.

While the preceding discussion has emphasized equal operating pressures for the fluid motors, an additional advantage of the present invention is that it is adaptable to provide other than equally proportioned operating pressures to the fluid motors. For instance, a vehicle of asymmetrical design, with unequal weights on its drive wheel, should be driven with torques proportioned to the relative weights on its drive wheels.

DETAILED DESCRIPTION OF THE INVENTION

Figure 1:
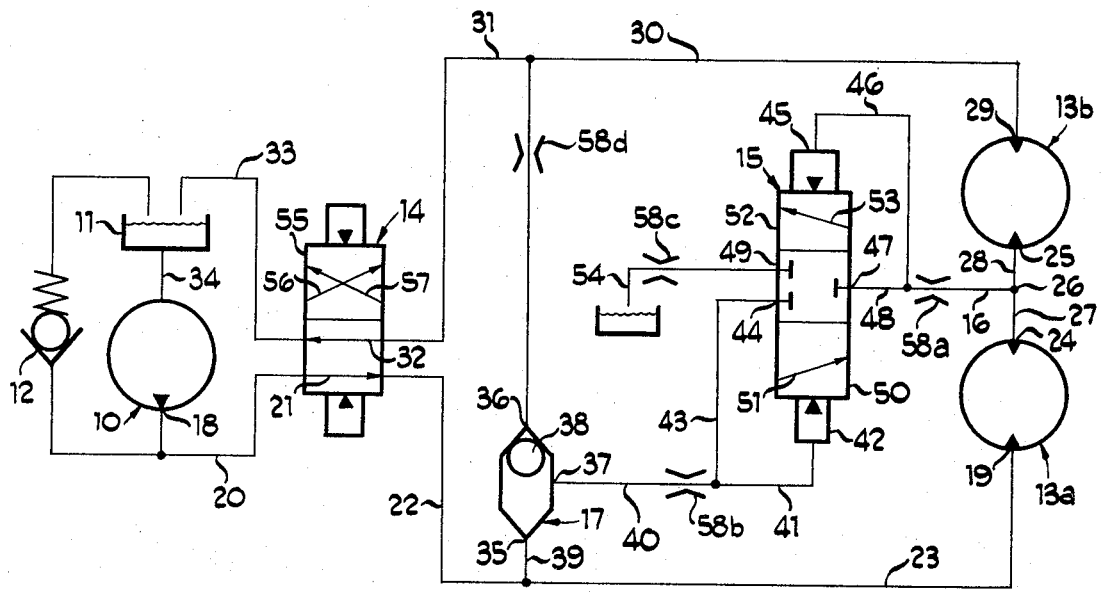
FIG. 1 is a schematic diagram of the present invention in which a control valve provides for reversibility of the fluid motors.

The configuration of FIG. 1 includes a pump 10, a sump 11, and a relief valve 12 as a source of fluid pressure. The source delivers fluid pressure to series connected fluid motors 13a and 13b via reversing valve 14. Equalizer valve 15 is connected to motors 13 and 13b by conduits 16 and 48 and reversible flow logic valve 17.

In operation, pump 10 delivers pressurized fluid from discharge port 18 of pump 10 to first inlet-outlet port 19 of motor 13a via conduit 20, valve passage 21, and conduits 22 and 23. Fluid exhausted from port 24 of motor 13a is delivered to port 25 of motor 13b via intermediate junction 26 which includes conduits 27 and 28. Fluid discharged from second inlet-outlet port 29 of motor 13b is returned to pump 10 via conduits 30 and 31, valve passage 32, conduit 33, sump 11, and conduit 34.

Logic valve 17 includes a first inlet port and seat 35, a second inlet port and seat 36, a logic port 37, and a ball or shuttle 38.

Pressurized fluid from pump 10 and conduit 22 enters first inlet port 35 via conduit 39 forcing ball 38 against second inlet port and seat 36 and thereby providing a reversible flow path from first inlet port 35 to logic port 37. Thus pump fluid from conduit 22 is applied to logic port 37, conduits 40 and 41, first operator 42, conduit 43, and port 44 of equalizer valve 15. At the same time, fluid from intermediate junction 26 is applied to second operator 45 via conduits 16 and 46; and also, fluid from intermediate junction 26 is applied to port 47 via conduit 48.

Thus equalizer valve 15 is controlled by fluid pressure from pump 10 being applied to first operator or first fluid responsive area 42 and by fluid from intermediate junction 26 being applied to second operator or second fluid responsive area 45.

If it is desired that motors 13a and 13b operate at equal differential pressures; and if it is assumed that the fluid pressure in inlet-outlet port 29 is negligible, then second operator 45 will be designed to have a fluid responsive area that is twice that of operator 42.

A fluid pressure in operator 42 that is more than twice the fluid pressure in operator 45 will move equalizer valve 15 from neutral position 49 as shown, to first operating position 50 wherein pressurized fluid from pump discharge port 18 is bypassed to intermediate junction 26 via logic valve 17 and valve passage 51 of equalizer valve 15.

A fluid pressure in intermediate junction 26 and second operator 45 that is more than one-half of the fluid pressure in operator 42 will be effective to move equalizer valve 15 to second operating position 52 and excess fluid from intermediate junction 26 will be bypassed to sump 11a via valve passage 53, restriction 58c and conduit 54.

The flow reversibility of the fluid connection that is made by logic valve 17 cooperates with operator 45 in the moving of equalizer valve 15 to second operating position 52 by allowing first operator 52 to discharge fluid to conduit 23 and to inlet-outlet port 19 of motor 13a.

Reverse operation of motors 13 is the same; reversing valve 14 is moved to reverse operating position 55 whereby pressurized fluid from pump 10 is delivered to inlet-outlet port 29 via valve passage 56, and exhaust fluid from inlet-outlet port 19 of fluid motor 13a is returned to pump 10 via valve passage 57.

In reverse operation, ball or shuttle 38 of logic valve 17 is forced against first inlet port and seat 35 thereby providing a reversible flow path between conduits 31 and first operator 42.

A fluid restricting means may be added at one or more places in the system to limit the flow capacity of equalizer valve 15. Thus, equalizer valve 15, which functions as a hydraulic differential for motors 13, becomes a limited slip differential valve.

An orifice 58a in conduits 16 or 48 would be effective to limit flow during both bypassing functions; whereas an orifice 58b in conduits 40 or 43 or an orifice 58c would be effective to limit the flow during only one of the bypassing functions. In like manner, an orifice 58d would be effective to limit only one of the bypassing functions, and it would be effective only in reverse.

Figure 2:
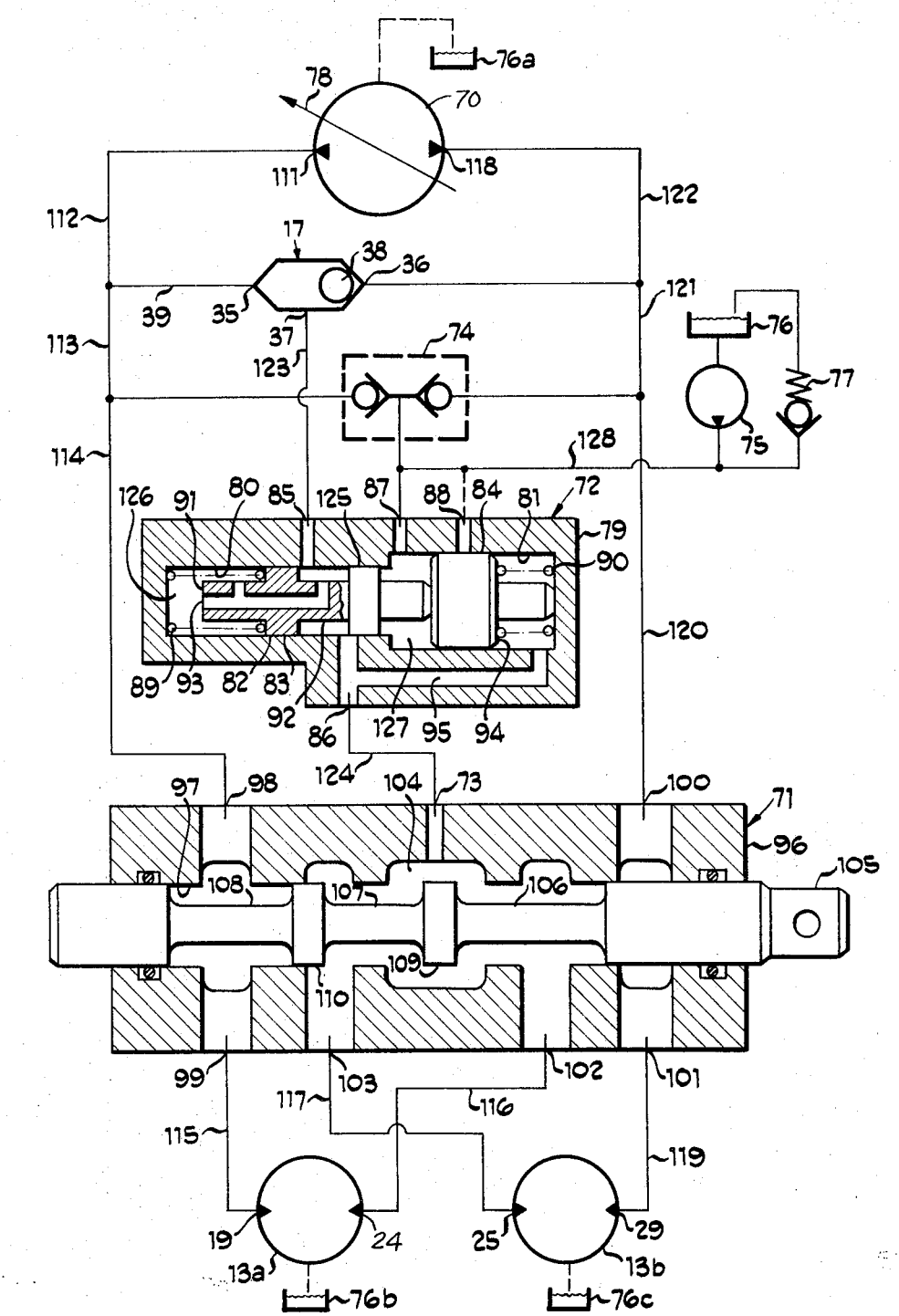
FIG. 2 is a diagram of the preferred embodiment of the present invention. The pressure equalizer valve and the series parallel valve are shown in section with the series parallel valve in the series position.

The preferred embodiment shown in FIG. 2 includes flow reversible pump 70 which supplies pressurized fluid to series connected motors 13 and 13b via series parallel valve 71 and which receives exhaust fluid back from series connected motors 13a and 13b via series parallel valve 71.

Equalizer valve 15 of FIG. 1 is shown in FIG. 2 in cross-section as equalizer valve 72. Equalizer valve 72 is connected to series connected motors 13a and 13b via intermediate junction port 73 of series parallel valve 71, via reversible flow logic valve 17, and via second logic means or parallel connected check valves 74.

Charging pump 75, sump 76, and relief valve 77 comprises a charging pump means to make up for the leakage of pump 70 which is discharged to sump 76a for the leakage of motors 13a and 13b which is discharged to sumps 76b and 76c respectively.

Flow reversible pump 70 includes a reversal means or displacement control means of the over-center type as indicated by arrow 78.

Equalizer valve 72 includes a body or housing 79 having a first bore 80 and a second bore 81, a stepped valving piston 82 consisting of first piston 83 and second piston 84 being slidably fitted in bores 80 and 81.

Body 79 is equipped with a pressure inlet port 85 and an intermediate junction port 86, a discharge port 87, an optional discharge port 88, and optionally, a resilient bias means in the form of a spring 89 or a spring 90.

Equalizer valve 72 includes a first fluid responsive area which consists of projected end areas 91 of first piston 83 and which is communicated to reduced diameter portion 92 of first piston 83 via longitudinal and cross hole passages 93.

Equalizer valve 72 also includes a second fluid responsive area which consists of the projected end areas 94 of second piston 84. This second fluid responsive area is connected to intermediate junction port 86 by passage 95.

Series parallel valve 71 includes a valve body 96, having a spool bore 97, a first inlet-outlet pump port 98, a first inlet-outlet motor port 99 which is common to port 98, a second inlet-outlet pump port 100, a second inlet-outlet motor port 101 which is common to port 100, a first series parallel port 102, a second series parallel port 103, and an intermediate junction chamber 104 which is the equivalent of junction 26 of FIG. 1.

Valve spool 105 is slidably fitted into bore 97. Valve spool 105 inc'udes reduced diameter portions 106, 107, and 108; and valve spool 97 also includes land portions 109 and 110.

In operation pump 70 delivers pressurized fluid from first intake-discharge port 111 to first inlet-outlet port 19 of motor 13a via conduit 112, conduit 113, conduit 114, port 99, and conduit 115.

Fluid discharged from first series parallel port 24 of motor 13a is delivered to second series parallel port 25 via conduit 116, series parallel port 102, reduced diameter portion 106, intermediate junction chamber 104, reduced diameter portion 107, series parallel port 103, and conduit 117.

Fluid discharged from second inlet-outlet port 29 is returned to second intake-discharge port 118 via conduit 119, port 101, port 100, and conduits 120, 121 and 122.

Pump discharge pressure in conduits 112 and 39 is effective to actuate ball 38 of logic valve 17 thereby providing a reversible flow path from conduit 112 to pressure inlet port 85 via logic port 37 and conduit 123. Pump discharge pressure in port 85 is applied to first fluid responsive area 91 via longitudinal and cross hole passages 93.

Pressure from intermediate junction port 73 is applied to port 86 of equalizer valve 72 via conduit 124, and pressure from port 86 is applied to second fluid pressure responsive area 94 via passage 95.

Stepped valving piston 82 is moved to the right, to a first operating position as shown, whenever pump pressure being applied to area 91 creates a force greater than that created by intermediate junction pressure being applied to area 94, and fluid is bypassed from pressure inlet port 85 to intermediate junction port 86.

Whenever the intermediate junction pressure being applied to area 94 creates the greater force, stepped valving piston 82 moves to the left, valving land 125 blocks communication between port 85 and port 86, and fluid in operator chamber 126 is returned to conduits 112 and 113 via holes 93, reduced diameter portion 92, port 85, conduit 123, logic valve 17, and conduit 39. Return of fluid from chamber 126 allows land 125 to move far enough to the left, to a second operating position, to allow fluid from port 86 to flow to port 87 via chamber 127. From port 87, the fluid flows via second logic means 74 to whichever pump port, 111 or 118, is operating as the intake port; or the fluid flows to sump 76 via conduit 128 and relief valve 77.

An important feature is that areas 91 and 94 may be proportioned as desired, and this proportionality will be the same for reverse operation, because operation in reverse is the same as has been described, except that pump 70 delivers pressurized fluid from port 118 to motor port 29 and ball 38 of logic valve 17 moves to seat against first port and seat 35.

Another important feature is that logic valve 17, in being pressure actuated or pressure sensitive, is effective to connect the higher pressure conduit to port 85 whether this higher pressure is being produced by pump 70 or by an inertial or gravity overrun of the load driving motors 13a and 13b. Therefore, equalizer valve 72 is effective to control the relative pressures of motors 13a and 13b during conditions of load overrun when the pressure in conduit is being developed by the overrun action of the load on motors 13a and 13b and by the dynamic braking action of pump 70 and its prime mover as they resist the driving action of the load and fluid motors.

Figure 3:
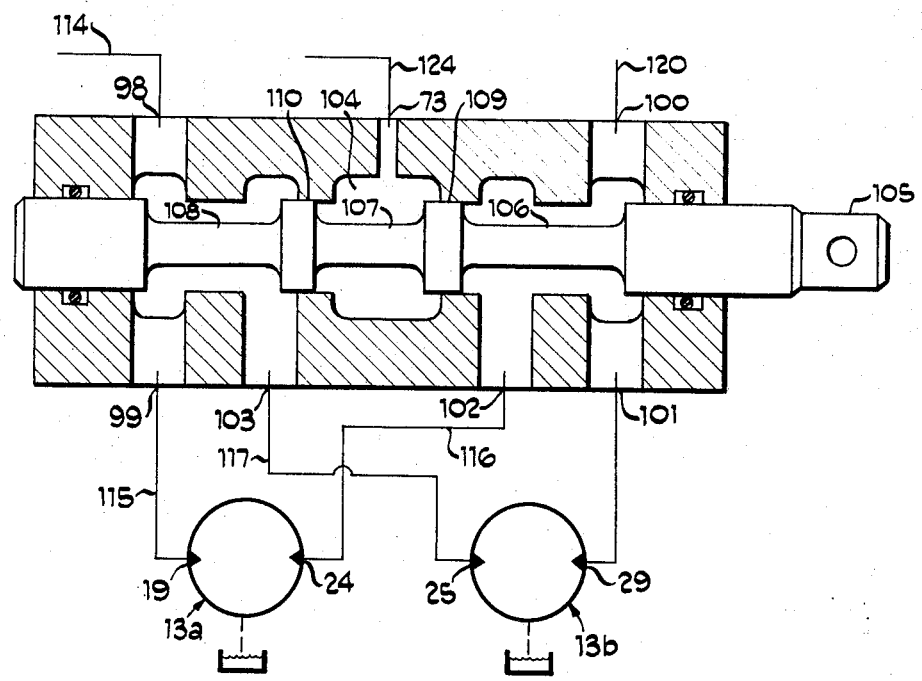
FIG. 3 is a view of the series parallel valve in the parallel position.

FIG. 3 shows series parallel valve 71 of FIG. 2 with valve spool 105 having been moved to the parallel position. With pump 70 delivering pressurized fluid to port 98, motor 13a receives pressurized fluid from port 99, and motor 13b receives pressurized fluid via reduced diameter portion 108 and port 103. Motor 13a discharges fluid to port 100 via port 102 and reduced portion 106, and motor 13b discharges fluid to port 100 via port 101.

In the parallel position of valve 71, intermediate junction port 73 is isolated from series parallel ports 102 and 103 by land portions 109 and 110 respectively, thereby rendering equalizer valve 71 inoperative when series parallel valve 71 is in the parallel position.

Having thus described the invention, it will be understood that variations and modifications may be effected without departing from the spirit and scope of the novel concepts of this invention.

We claim:

1. A source of fluid pressure including a pump adapted to supply fluid pressure to a hydraulic system and to receive exhaust fluid therefrom;
   a first reversible fluid motor and a second reversible fluid motor connected in series thereby providing a first inlet-outlet port in said first motor, a second inlet-outlet port in said second motor, and an intermediate junction at the connection between said motors;
   conduit means connecting said first inlet-outlet port to said source to receive pressurized fluid therefrom and connecting said second inlet-outlet port to said source to return exhaust fluid thereto;
   reversing means adapted to selectively change the flow of said pump so that said second inlet-outlet port receives pressurized fluid from said source and said first inlet-outlet port returns exhaust fluid to said source;
   reversible flow logic means having a logic port, a first input port connected to said first inlet-outlet port, having a second input port connected to said second inlet-outlet port, and effective to establish reversible flow fluid communication between said logic port and whichever of said input ports is receiving pressurized fluid from said source;
   and a pressure equalizer valve connected to said logic port, to said intermediate junction, and adapted to bypass fluid from said logic port to said intermediate junction and from said intermediate junction to said source depending upon the relative fluid pressures in said logic port and in said intermediate junction, and effective to control the pressure differentials across said first and second motors.

2. The system as claimed in claim 1 in which said reversing means includes a control valve interposed in said conduit means between said source and said inlet-outlet ports.

3. The system as claimed in claim 1 in which said reversing means includes displacement control means connected to said pump and adapted to reverse the flow through said pump.

4. The system as claimed in claim 1 in which said pump has first and second ports, said conduit means connects one of said pump ports to one of said input-output ports and the other of said pump ports to the other of said input-output ports, and said motors are connected to and drive a load, whereby dynamic braking is achieved and overrun of said load restrained when said load and said motors attempt to return fluid to said pump at a greater flow rate than said pump is supplying fluid to said motors.

5. The system as claimed in claim 4 in which said reversible flow logic means is pressure responsive to fluid pressures in said conduits, whereby said logic means is effective to actuate said equalizer valve and said equalizer valve is effective to control the pressure differentials across said motor during said dynamic braking.

6. The system as claimed in claim 4 which includes second logic means connected to said equalizer valve, connected to said first inlet-outlet port, connected to said second inlet-outlet port, and adapted to allow said equalizer valve to bypass fluid from said intermediate junction to whichever of said inlet-outlet ports contains the lower f'uid pressure.

7. The system as claimed in claim 6 in which said second logic means includes first and second check valves.

8. The system as claimed in claim 1 in which said reversible flow logic means includes a three port shuttle valve.

9. The system as claimed in claim 1 in which said pressure equalizer valve includes a first fluid responsive area operatively connected to said logic port and a second fluid responsive area operatively connected to said intermediate junction, whereby th relative size of said fluid responsive areas and the relative pressures in said logic port and in said intermediate junction are effective to control the bypassing of fluid.

10. The system as claimed in claim 9 in which said second fluid responsive area is substantially twice as large as said first fluid responsive area.

11. The system as claimed in claim 9 in which said pressure equalizer valve includes a valving piston, said first fluid responsive area is adapted to move said valving piston to a first operating position wherein fluid is bypassed from said logic port to said intermediate junction, said second fluid responsive area is adapted to move said valving piston to a second operating position wherein fluid is bypassed from said intermediate junction to said source, and resilient bias force means assists one of said areas in moving said valving piston toward one of said operating positions.

12. The system as claimed in claim 11 which includes charging pressure means being adapted to maintain above atmospheric pressure in said conduit means, said valving piston comprises a stepped cylinder which includes projected end areas comprising said first and second areas and a third fluid responsive area, said third area is operatively connected to said conduit means containing said charging pressure and is responsive thereto, and said resilient bias means is a spring, said spring being adapted to substantially balance the force developed by said charging pressure being applied to said third area.

13. The system as claimed in claim 1 in which said source includes a sump and said pressure equalizer valve bypasses fluid from said intermediate junction to said sump.

14. The system as claimed in claim 1 which includes a series parallel valve connected to said conduit means and into said connection between said motors and adapted to selectively change said series connection of said motors to a parallel connection.

15. The system as claimed in claim 14 in which said series parallel valve blocks operation of said equalizer valve when said series parallel valve connects said motors in parallel.

16. The system as claimed in claim 14 in which said series parallel valve includes a valve body having a spool bore therein and a valve spool slidably fitted into said bore, said body includes a first inlet-outlet port intersecting said bore, a second inlet-outlet port spaced longitudinally from said first inlet-outlet port and intersecting said bore, first and second series parallel ports intersecting said bore and interposed between said first and second inlet-outlet ports, and an intermediate junction port intersecting said bore and interposed between said first and second series parallel ports.

17. The system as claimed in claim 16 in which said valve spool includes three reduced diameter portions and two land portions therebetween, and said two land portions are effective to isolate said intermediate junction port from said series parallel ports when one of said reduced diameter portions is connecting said first series parallel port to said first inlet-outlet port and another of said reduced diameter portions is connecting said second series parallel port to said second inlet-outlet port.

18. The system as claimed in claim 1 which includes fluid restrictor means interposed in said system and adapted to limit the ability of said equalizer valve to bypass fluid.

* * * * *